(12) United States Patent
Hood et al.

(10) Patent No.: US 7,263,583 B2
(45) Date of Patent: Aug. 28, 2007

(54) ON DEMAND, NON-CAPACITY BASED PROCESS, APPARATUS AND COMPUTER PROGRAM TO DETERMINE MAINTENANCE FEES FOR DISK DATA STORAGE SYSTEM

(75) Inventors: Robert A. Hood, Boca Raton, FL (US); Alan L. Stuart, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 10/959,859

(22) Filed: Oct. 5, 2004

(65) Prior Publication Data

US 2006/0075189 A1 Apr. 6, 2006

(51) Int. Cl.
*G06F 12/14* (2006.01)
(52) U.S. Cl. ..................... 711/114; 705/400
(58) Field of Classification Search ............. 705/32, 705/52, 418, 400; 711/114
See application file for complete search history.

(56) References Cited

U.S. PATENT DOCUMENTS

| | | | |
|---|---|---|---|
| 5,063,506 A | 11/1991 | Brockwell et al. | 364/402 |
| 5,337,258 A | 8/1994 | Dennis | 364/551.01 |
| 5,371,882 A | 12/1994 | Ludlam | 395/575 |
| 5,732,401 A | 3/1998 | Conway | 705/29 |
| 5,828,583 A | 10/1998 | Bush et al. | 364/551.01 |
| 5,832,204 A | 11/1998 | Apperley et al. | 395/183.18 |
| 6,249,887 B1 | 6/2001 | Gray et al. | 714/47 |
| 6,411,943 B1 | 6/2002 | Crawford | 705/400 |
| 6,609,212 B1 | 8/2003 | Smith | 714/4 |
| 6,868,398 B2* | 3/2005 | Sanada et al. | 705/32 |
| 7,136,970 B2* | 11/2006 | Yoshiya et al. | 711/152 |
| 2002/0112118 A1 | 8/2002 | Komachiya et al. | 711/114 |
| 2002/0138691 A1* | 9/2002 | Yamamoto et al. | 711/112 |
| 2003/0110254 A1 | 6/2003 | Fujita et al. | 709/224 |
| 2003/0204788 A1 | 10/2003 | Smith | 714/47 |
| 2003/0236758 A1* | 12/2003 | Iwatani et al. | 705/400 |

OTHER PUBLICATIONS

"Disk Systems and the Internal Bandwidth Wars", David J. Sacks, Technology Insights, Mar. 18, 2003, 12 pages.
"IBM Total Storage Enterprise Storage Server™ Model 800—RAID 5 and RAID 10 Configurations Running Oracle® Database Performance Comparisons", IBM Systems Group, May 2003, 15 pages.

* cited by examiner

*Primary Examiner*—Pierre Bataille
*Assistant Examiner*—Sheng-Jen Tsai
(74) *Attorney, Agent, or Firm*—Harrington & Smith, PC

(57) ABSTRACT

In one aspect the invention provides a signal bearing medium tangibly embodying a program of machine-readable instructions that are executable by a digital processing apparatus to perform operations to determine a maintenance fee for a data storage system. The operations include monitoring at least one data storage device during operation of the data storage system to determine a duty cycle and determining a current value of the maintenance fee based at least in part on the determined duty cycle. In a further disk drive-based embodiment the operations may include, or be instead, determining a disk drive redundancy configuration of disk drives of a data storage system. The operations then compare the determined duty cycle to a threshold value and assert a redundancy configuration change signal based on the result of the comparison. For a RAID configuration embodiment having a RAID level, the asserting operation asserts a RAID level change signal based on the result of the comparison.

20 Claims, 3 Drawing Sheets

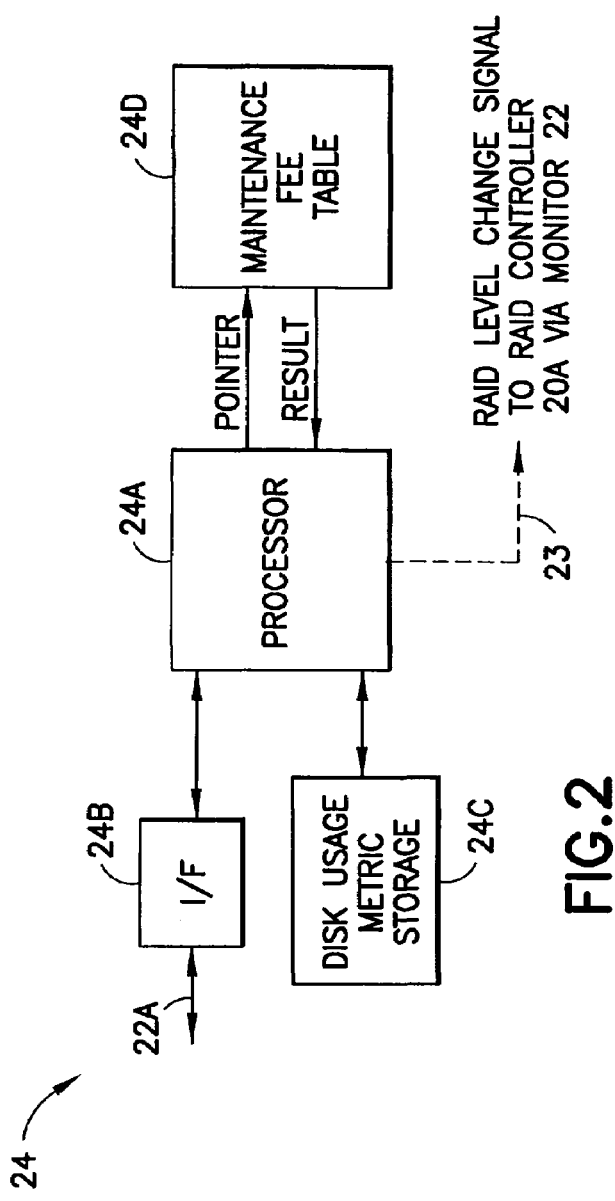
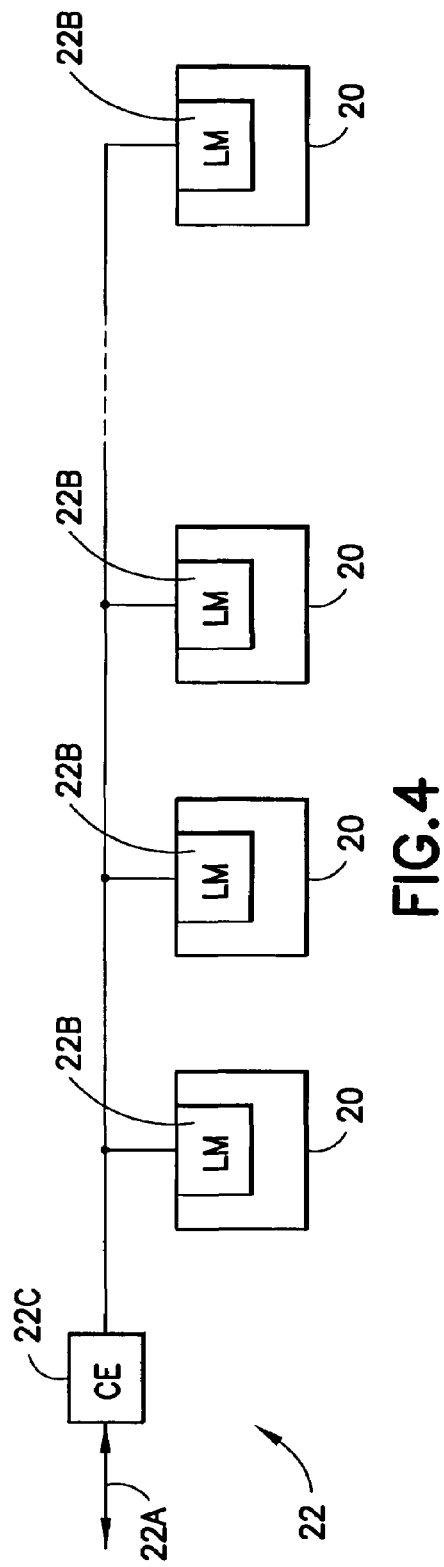
FIG.2
FIG.4

US 7,263,583 B2

ON DEMAND, NON-CAPACITY BASED PROCESS, APPARATUS AND COMPUTER PROGRAM TO DETERMINE MAINTENANCE FEES FOR DISK DATA STORAGE SYSTEM

TECHNICAL FIELD

These teachings relate generally to disk-based data storage systems and methods and, more particularly, relate to data storage systems that are composed a plurality of disk drives and to techniques for determining and charging maintenance fees for such data storage systems.

BACKGROUND

In data storage systems, an array of independent storage devices can be configured to operate as a single virtual storage device using a technology known as RAID (Redundant Array of Independent Disks—first referred to as a 'Redundant Array of Inexpensive Disks' by researchers at University of California at Berkeley). In this context, 'disk' is often used as a short-hand for 'disk drive'.

A RAID storage system includes an array of independent storage devices and at least one RAID controller. A RAID controller provides a virtualized view of the array of independent storage devices, and a computer system configured to operate with the RAID storage system can perform input and output (I/O) operations as if the array of independent storage devices of the RAID storage system were a single storage device. The array of storage devices thus appear as a single virtual storage device with a sequential list of storage elements. The storage elements are commonly known as blocks of storage, and the data stored within the data blocks are known as data blocks. I/O operations (such as read and write) are qualified with reference to one or more blocks of storage in the virtual storage device. When an I/O operation is performed on the virtual storage device, the RAID controller maps the I/O operation onto the array of independent storage devices. In order to virtualize the array of storage devices and map I/O operations the RAID controller may employ standard RAID techniques that are well known in the art. Some of these techniques are briefly considered below.

A RAID controller spreads data blocks across the array of independent storage devices. One way to achieve this is using a technique known as Striping. Striping involves spreading data blocks across storage devices in a round-robin fashion. When storing data blocks in a RAID storage system, a number of data blocks known as a strip is stored in each storage device. The size of a strip may be determined by a particular RAID implementation, or it may be configurable. A row of strips comprising a first strip stored on a first storage device and subsequent strips stored on subsequent storage devices is known as a stripe. The size of a stripe is the total size of all strips that comprise the stripe.

The use of multiple independent storage devices to store data blocks in this way provides for high performance I/O operations when compared to a single storage device, because the multiple storage devices can act in parallel during I/O operations. Performance improvements are one of the major benefits of RAID technology. Hard disk drive performance is important in computer systems, because hard disk drives are some of the slowest internal components of a typical computer.

Some hard disk drives are known for poor reliability, and yet hard disk drive reliability is critical because of the serious consequences of an irretrievable loss of data (or even a temporary inaccessibility of data). An important purpose of typical RAID storage systems is to provide reliable data storage.

One technique to provide reliability involves the storage of check information along with data in an array of independent storage devices. Check information is redundant information that allows regeneration of data which has become unreadable due to a single point of failure, such as the failure of a single storage device in an array of such devices. Unreadable data is regenerated from a combination of readable data and redundant check information. Check information is recorded as 'parity' data which may occupy a single strip in a stripe, and is calculated by applying the EXCLUSIVE OR (XOR) logical operator to all data strips in the stripe. For example, a stripe comprising data strips A, B and C would have an associated parity strip calculated as A XOR B XOR C. In the event of a single point of failure in the storage system, the parity strip is used to regenerate an inaccessible data strip. If a stripe comprising data strips A, B, C and PARITY is stored across four independent storage devices W, X, Y and Z respectively, and storage device X fails, strip B stored on device X would be inaccessible. Strip B can be computed from the remaining data strips and the PARITY strip through an XOR computation. This restorative computation is A XOR C XOR PARITY=B. This exploits the reversible nature of the XOR operation to yield any single lost strip, A, B or C. Of course, the previous XOR can be repeated if the lost data is the PARITY information.

In addition to striping (for the performance benefits of parallel operation) and parity (for redundancy), another redundancy technique used in some RAID solutions is mirroring. In a RAID system using mirroring, all data in the system is written simultaneously to two hard disk drives. This protects against failure of either of the disks containing the duplicated data and enables relatively fast recovery from a disk failure (since the data is ready for use on one disk even if the other failed). These advantages have to be balanced against the disadvantage of increased cost (since half the disk space is used to store duplicate data). Duplexing is an extension of mirroring that duplicates the RAID controller as well as the disk drives—thereby protecting against a failure of a controller as well as against disk drive failure.

Different RAID implementations use different combinations of the above techniques. A number of standardized RAID methods are identified as single RAID "levels" 0 through 7, and "nested" RAID levels have also been defined. For example:

RAID 1 uses mirroring (or duplexing) for fault tolerance; whereas

RAID 0 uses block-level striping without parity—i.e. no redundancy and so without the fault tolerance of other RAID levels, and therefore good performance relative to its cost; RAID 0 is typically used for non-critical data (or data that changes infrequently and is backed up regularly) and where high speed and low cost are more important than reliability;

RAID 3 and RAID 7 use byte-level striping with parity; and

RAID 4, RAID 5 and RAID 6 use block-level striping with parity. RAID 5 uses a distributed parity algorithm, writing data and parity blocks across all the drives in an array (which improves write performance slightly and enables improved parallelism compared with the dedicated parity drive of RAID 4). Fault tolerance is maintained in RAID 5 by ensuring that the parity information for any given block of data is stored on a drive separate from the drive used to store the data itself. RAID 5 combines good performance, good fault tolerance and high capacity and storage efficiency, and has been considered the best compromise of any single RAID level for applications such as transaction processing and other applications which are not write-intensive.

In addition to the single RAID levels described above, nested RAID levels are also used to further improve performance. For example, features of high performance RAID 0 may be combined in a nested configuration with features of redundant RAID levels such as 1, 3 or 5 to also provide fault tolerance.

RAID 01 is a mirrored configuration of two striped sets, and RAID 10 is a stripe across a number of mirrored sets. Both RAID 01 and RAID 10 can yield large arrays with (in most uses) high performance and good fault tolerance.

A RAID 15 array can be formed by creating a striped set with parity using multiple mirrored pairs as components. Similarly, RAID 51 is created by mirroring entire RAID 5 arrays—each member of either RAID 5 array is stored as a mirrored (RAID 1) pair of disk drives. The two copies of the data can be physically located in different places for additional protection. Excellent fault tolerance and availability are achievable by combining the redundancy methods of parity and mirroring in this way. For example, an eight drive RAID 15 array can tolerate failure of any three drives simultaneously. After a single disk failure, the data can still be read from a single disk drive, whereas RAID 5 would require a more complex rebuild.

As an example, RAID 5 enables single drive errors to be corrected. In an exemplary 14 drive RAID 5 system there can be 12 drives that store data, one drive to store parity, and one spare drive to which the information on a failed drive can be migrated during a RAID rebuild operation. However, a 14 drive RAID 10 system is partitioned as two sets of six data drives and one parity drive. As a result, it can be appreciated that it would require about twice the number of physical disks, as compared with RAID 5, to meet the same storage capacity requirement (the exact ratio is 2N/(N+1), where N is the number of data disks in the RAID 5 array). It is known that a RAID 5 configured system can be migrated to a RAID 10 system, but the reverse is not generally true.

The relatively low cost parallel Advanced Technical Attachment (ATA) disk drive, also sometimes referred to as an Integrated Drive Electronics (IDE) drive, and the serial ATA, or SATA disk drive, have been widely used for years in consumer Personal Computer (PC) equipment (both desktop and laptop). However, at least partially in response to the evolutionary increase in the data storage capacity of these disk drives a trend is developing to utilize the ATA and/or SATA drives in larger scale open and enterprise level disk-based storage systems, including RAID-based storage systems such as those briefly discussed above.

A problem that is created as a result of this trend relates to reliability, as the inherent reliability of the ATA and SATA drives, and the consequent Mean Time Between Failure (MTBF), can be significantly less that for other types of disk drives that have traditionally been used in large scale, enterprise-class disk storage systems. One result is that the failure rate and the subsequent maintenance costs for the disk storage system manufacturer can be greater than those that have traditionally been experienced where, in conventional systems, the maintenance fees charged to the user are typically a function of the total data storage capacity that is used.

U.S. Pat. No. 5,828,583 discusses ATA disk drives and the monitoring of certain attributes during operation in order to attempt to predict imminent failure of a disk drive.

U.S. Pat. No. 5,371,882 discusses a technique for predicting when a pool of shared spare disk drives, used in a large form factor disk drive memory having redundancy groups, will be exhausted by recording disk drive failure data and extrapolating past failure events to a spare disk drive exhaustion target date.

U.S. Pat. No. 6,411,943 B1 discusses in col. 57, line 46, to col. 58, line 10, an on-line service for billing a customer based on an amount of time and/or an amount of virtual disk storage that is read or written on behalf of the customer.

SUMMARY OF THE PREFERRED EMBODIMENTS

The foregoing and other problems are overcome, and other advantages are realized, in accordance with the presently preferred embodiments of these teachings.

In one aspect thereof this invention provides a signal bearing medium tangibly embodying a program of machine-readable instructions that are executable by a digital processing apparatus to perform operations to determine a maintenance fee for a data storage system. The operations include monitoring at least one data storage device during operation of the data storage system to determine a data storage device duty cycle and determining a current value of the maintenance fee based at least in part on the determined data storage device duty cycle.

In one aspect thereof this invention provides a signal bearing medium tangibly embodying a program of machine-readable instructions that are executable by a digital processing apparatus to perform operations to determine a disk drive redundancy configuration of disk drives of a data storage system. The operations include monitoring the disk drives during operation of the data storage system to determine the duty cycle, comparing the determined duty cycle to a threshold value and asserting a redundancy configuration change signal based on the result of the comparison. For an embodiment where the disk drives are operated in a RAID configuration having a RAID level, the asserting operation asserts a RAID level change signal based on the result of the comparison.

In another aspect thereof this invention provides a disk drive having at least one rotating disk, at least one moveable disk read/write head and a monitor coupled at least to the at least one read/write head for recording and reporting to a maintenance fee determination function information that is descriptive of a disk drive duty cycle over a sampling interval.

In another aspect thereof this invention provides a disk drive where the monitor is coupled at least to the at least one read/write head for recording and reporting to a RAID level determination function information that is descriptive of a disk drive duty cycle over a sampling interval.

In another aspect thereof this invention provides a disk drive controller coupled to at least one disk drive, where each disk drive includes at least one rotating disk and at least one moveable disk read/write head. The disk drive controller includes a monitor coupled at least to the at least one read/write head for recording and reporting information that is descriptive of a disk drive duty cycle over a sampling interval to a maintenance fee determination function and/or to a RAID level determination function.

In a still further aspect of this invention there is provided a maintenance provider system operable for establishing a value for a maintenance fee to be charged for operating disk drive data storage system. The maintenance provider system includes an interface for coupling to a monitor that monitors operation of the disk drive data storage system to determine usage of disk drives; and further includes a processor responsive to information received from the monitor via the interface to determine a disk drive utilization factor and, based at least in part on the determined utilization factor, a current value for the maintenance fee.

In a yet still further aspect of this invention there is provided a disk drive-based data storage system that includes: means for monitoring the disk drives during operation of the data storage system to determine usage information for the disk drives, the usage information comprising at least one of a number of write operations per unit time, a number of read operations per unit time, and a number of seek operations per unit time; and interface means for coupling to means for determining a maintenance fee for the data storage system, where the interface means reports the usage information to the determining means.

In a non-limiting embodiment where there are a plurality of disk drives operated in a RAID configuration having a RAID level, the disk drive-based data storage system further includes: means for comparing the usage information to a threshold value and means for asserting a RAID level change signal based on the result of the comparison.

BRIEF DESCRIPTION OF THE DRAWINGS

The foregoing and other aspects of the teachings in accordance with this invention are made more evident in the following Detailed Description of the Preferred Embodiments, when read in conjunction with the attached Drawing Figures, wherein:

FIG. 2 is a simplified block diagram of the maintenance provider shown in FIG. 1;

FIG. 4 is a simplified block diagram showing a distributed embodiment of the disk usage monitor of FIG. 1.

DETAILED DESCRIPTION OF THE PREFERRED EMBODIMENTS

Figure 1:
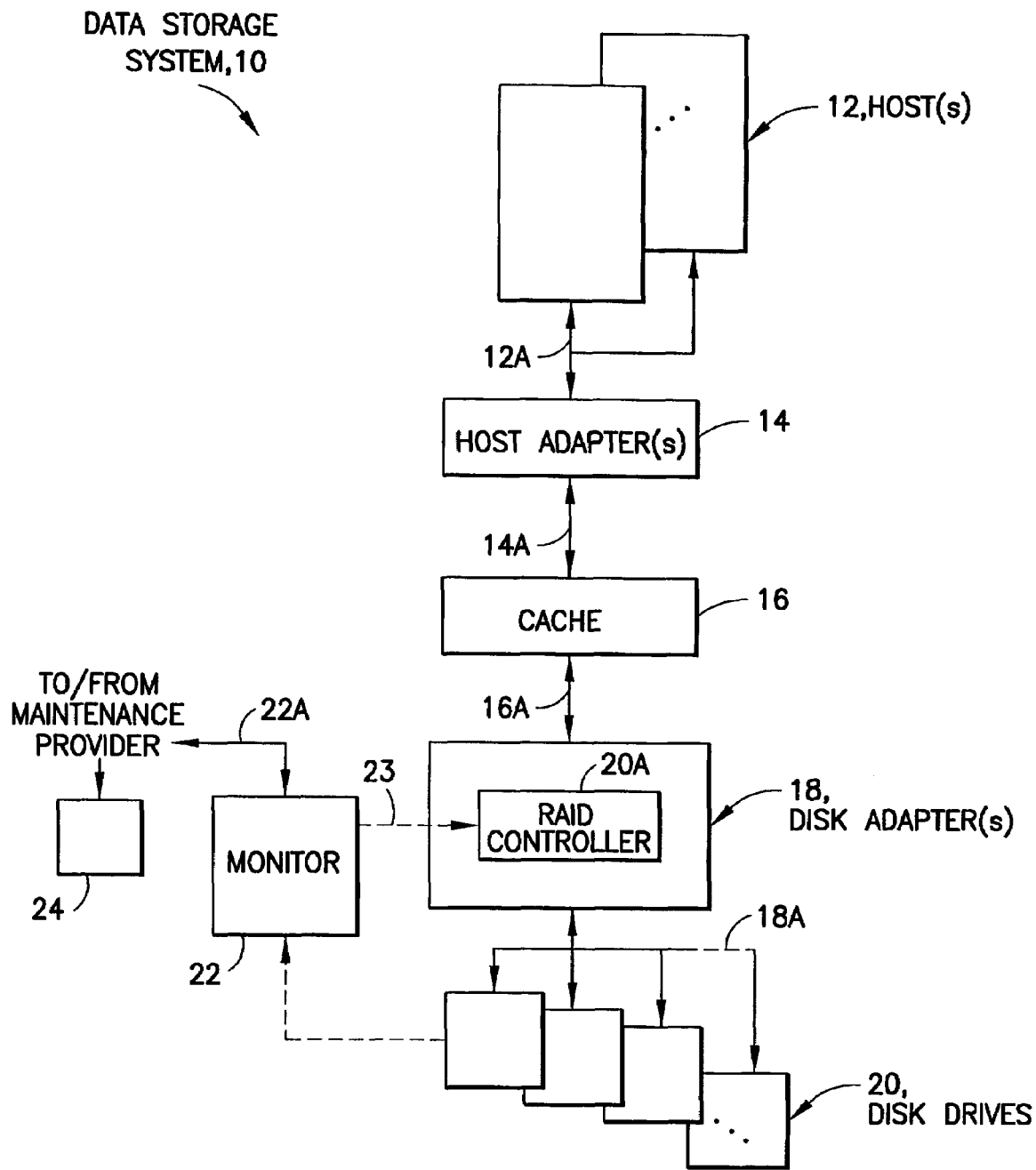
FIG. 1 is a block diagram of a disk-based data storage system having a disk usage monitor in accordance with embodiments of this invention.

Reference is made to FIG. 1 for showing a block diagram of a disk-based data storage system 10 that is constructed and operated in accordance with embodiments of this invention. In this non-limiting example of the disk drive system 10 it is assumed that there is at least one host 12, such as a mainframe or any other suitable type of computer, that is coupled via data paths 12A to at least one host adapter 14. The at least one host adapter 14 is coupled via data paths 14A to a data cache 16 that in turn is coupled via data paths 16A to at least one disk adapter 18. At least one disk drive, but typically a plurality of disk drives 20 are coupled to the disk adapter(s) 18 via data paths 18A. The disk drives 20 may be organized in RAID fashion, e.g., they may be organized and operated in a RAID 5 configuration under the direction of a RAID controller 20A (shown for convenience as being associated with the disk adapter(s) 18). For the purposes of this description, but not as a limitation upon the practice of this invention, the disk drives 20 may be ATA or SATA-type disk drives.

In accordance with an aspect of this invention the system 10 is provided with a disk usage monitor 22. The disk usage monitor 22 is coupled directly or indirectly to the disk drives 20 and maintains a record of disk activity over time. The disk activity, which maybe considered a maintenance metric or a disk usage metric or even a disk utilization factor, can include a number of disk write operations per unit time (e.g., a number of write operations per five minutes, or per half hour), and/or a number of disk read operations per unit time, and/or a number of disk seek operations per unit time. If a metric of interest is disk seek activity, then a component of a disk drive seek event may be the actual distance that the disk head was required to move (e.g., measured in tracks). Depending on the type of disk drive, the disk activity may also include a number of times that the disk drives are spun up and/or spun down per unit time.

It can be noted that these various exemplary types of disk activity reflect mechanical operation of the disk drives 20, and are thus an indication of the disk drive usage per unit of time, or the disk drive duty cycle, and in some case are indicative of input/output (I/O) utilization per unit of time. It is assumed that the greater is the usage of the disk drives per unit of time, i.e., the greater is the disk drive 20 duty cycle, the greater will be the probability of failure and, hence, the MTBF will be reduced proportionately. It can be further noted that these various maintenance metrics are not directly indicative of the used storage capacity of the disk drive system 10, as in the case of a traditional maintenance-related factor.

It is noted that the monitor 22 can be physically located at the level of the disk adapter(s)18, or the RAID controller 20A, or it can distributed throughout the disk drives 20, especially if each disk drive contains an embedded disk drive controller (for IDE drives), or less preferably it could be located further from the physical disk drives 20 at the level of the cache 16. In this latter case the monitor 22 may be aware of only cache hits vs. misses, as well as cache writebacks, and may thus correlate these and other cache activities with actual usage of the physical disk drives 20. The monitor 22 could be implemented in hardware, but is most preferably implemented in software or firmware, and may be embodied as a routine executed by the disk drive controller or some other logic each time that the head of a disk is moved, and/or a disk read operation is performed, and/or a disk write operation is performed. The monitor 22 may also be implemented as a combination of hardware and software, such as by providing at least one hardware counter that is incremented by firmware each time, for example, that a disk seek, or read, or write operation is performed. In a most preferred embodiment the hardware counter would simply be implemented as a memory location or locations managed by the software.

In order to report the results of the monitoring of the disk drives 20, a link 22A is preferably provided to provide communication with a co-located or a remotely located maintenance provider 24. The maintenance provider 24 could be the manufacturer of all or part of the system 10, or the maintenance provider 24 could be a third party that is contracted only to provide maintenance services for the system 10. The link 22A may be a dedicated connection, or it may be implemented using a local area network (LAN), or by using a wide area network, including the Internet, and it may enable communication via TCP/IP and/or other protocols, including wireless communication protocols. In general, the link 22A can be seen to represent any means of conveying the output of the disk usage monitor 22 to the maintenance provider 24, including manual means (e.g., periodically mailing a diskette having the disk drive maintenance metric data recorded thereon).

For the case where the monitor 22 is distributed through the disk drives 20, and referring briefly to FIG. 4, there may be a common entity (CE) 22C, such as one in the RAID controller 20A, that collects the disk usage data from a local monitor (LM) 22B in each disk drive 20 and that forwards the drive usage statistics to the maintenance provider 24 via the link 22A. This common entity 22C may be considered for the purposes of this description to form an I/O interface of the distributed disk usage monitor 22.

While the disk usage data output from the monitor 22 may be periodically pushed to the maintenance provider 24 from the monitor 22, preferably the disk usage data output is periodically pulled from the monitor 22 by the maintenance provider 24. The length of the period between pushes or pulls, i.e., the disk usage metric reporting frequency, may be fixed or it may be programmable and changeable by the maintenance provider 24, via the link 22A, during operation of the system 10.

Figure 3:
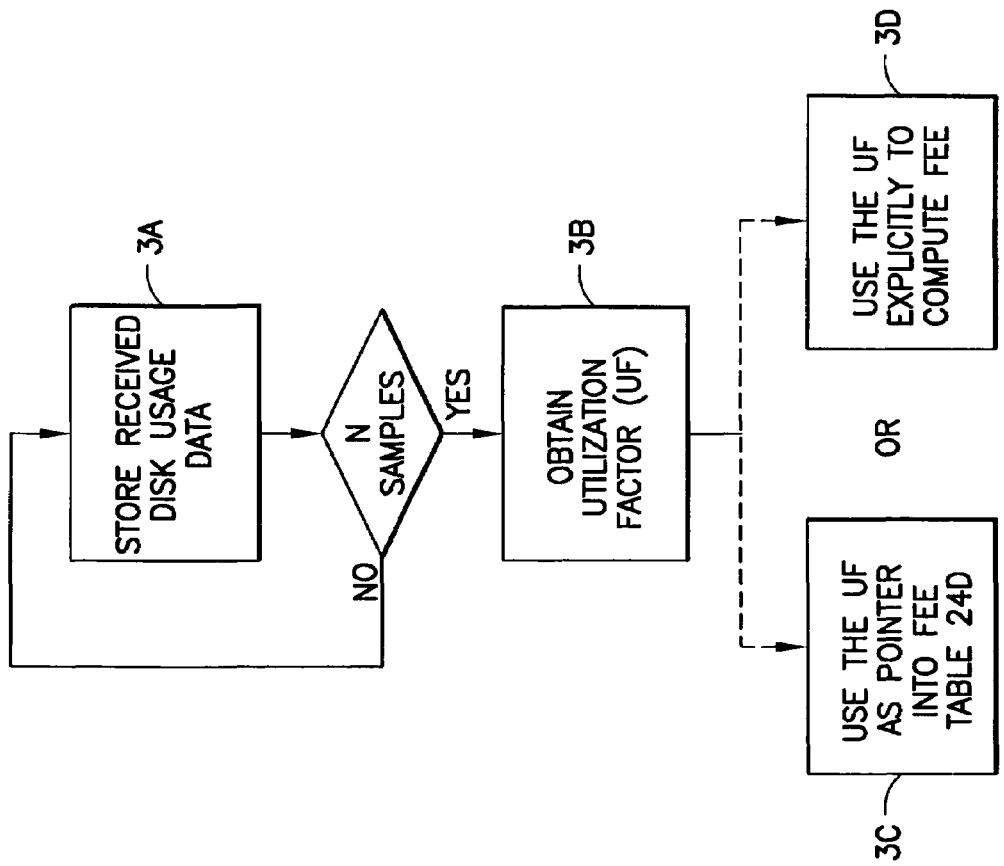
FIG. 3 is a logic flow diagram that illustrates operations of the maintenance provider 24.

Referring also to FIG. 2 in combination with FIG. 3, the maintenance provider 24 can include a data processor 24A coupled to the link 22A by a suitable link interface (I/F) 24B. The received disk usage data is periodically stored in a disk usage metric storage device or memory 24C (FIG. 3, block 3A), and is preferably accumulated over N periods of time (N sample periods) to obtain a trend (e.g., an hourly trend, or a daily trend, or a weekly trend, or a monthly trend, or a quarterly trend as several non-limiting examples) that reflects the actual usage of the disk drives 20, i.e., a utilization factor (FIG. 3, block 3B). The utilization factor may then be used as a pointer into a maintenance fee table 24D to obtain a result that reflects a maintenance fee billing amount that is based on actual usage of the disk drives 20 (FIG. 3, block 3C). Alternatively, the utilization factor may be used explicitly in a formula that is solved by the data processor 24A to dynamically compute a maintenance billing amount for each billing cycle (FIG. 3, block 3D). It is also within the scope of this invention to perform both types of operations, e.g., to employ the utilization factor to obtain a value from the table 24D, and to then use the obtained value to explicitly compute the maintenance fee (or vice versa). It should be noted that the user can be provided with detailed reports, based on the stored records in the disk usage metric storage 24C, to validate the billed amount.

It should be noted that as employed herein the utilization factor or utilization metric is related to the duty cycle of the disk drives 20, which in turn is a function of the usage of the disk drives 20, and not per se the amount of data stored on the disk drives 20, or the storage capacity (total or remaining) of the disk drives 20.

As a result of the use of these embodiments of the invention a user who only lightly uses the disk drives 20 (has a "light" duty cycle or utilization factor) can be charged a different amount than the user who uses the disk drives 20 more heavily (has a "heavy" duty cycle or utilization factor). Note as well that if disk seek operations (and seek distances) form a part of the disk usage metrics received by the maintenance provider 24, then different users may be charged differently depending on the type of disk I/O operations that they most commonly use. For example, a user who requires disk operations with many edge-to-edge disk seeks, such as in some data base applications, can be charged differently than a user who performs more sequential reads and/or writes (such as in archiving operations). In the same regard, the same user may be charged differently at different times depending on the user's most recent type of usage of the system 10. Note further that in a RAID-type of disk drive system, and by example, a RAID 5 system uses a read-modify-write operation to calculate parity, and the read-modify-write calculation is performed for each write operation. This type of operation thus can also directly influence the value of the utilization factor computed by the data processor 24A, and can differ among different users.

It is pointed out that the use of the monitor 22 may be optional, and that a given user may be provided with an incentive, such as a discount, to have the monitor 22 installed and utilized. It is further pointed out that the use of the monitor 22 also benefits the maintenance provider 24, as the maintenance provider 24 is enabled to charge a given user a maintenance fee that can be directly correlated with the MTBF of the disk drives 20, based on their actual usage, instead of with the amount of data that is stored on the disk drives 20. This type of on-demand, dynamic maintenance fee determination can be especially important when using the ATA and SATA type disk drives, that at least currently typically exhibit MTBF characteristics that are inferior to other types of disk drives that are conventionally used to construct high performance enterprise-level disk drive-based storage systems. However, the teachings of this invention can clearly be employed with data storage systems that use any type of disk drives and disk drive technology, as well as with other types of data storage systems where storage device reliability is an issue, such as in tape drive-based systems.

In general, this embodiment of the invention operates with at least one, but preferably an assemblage of data storage devices, such as disk drives, and includes operations of monitoring at least one data storage device during operation of the data storage system to determine a data storage device duty cycle, and determining a current value of the maintenance fee based at least in part of the determined data storage device duty cycle. These various operations can be performed by computer code or program instructions stored in a memory or memories (more generally stored in a signal bearing medium, including fixed or removable disks) and executed by one or more data processors that comprise a part of, or that are coupled to, the system 10.

Figure 5:
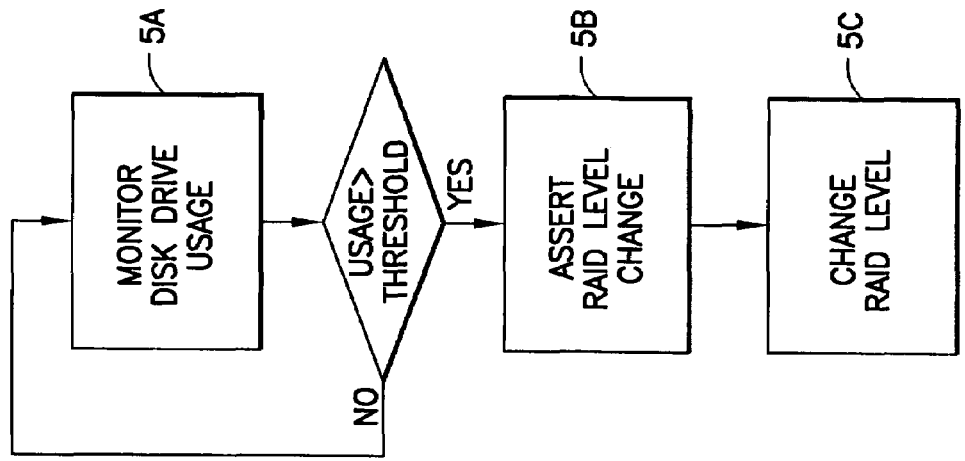
FIG. 5 is a logic flow diagram that illustrates operations of a RAID level change function further in accordance with embodiments of this invention.

A further aspect of this invention is illustrated in FIGS. 1 and 2 as the dashed signal line 23 drawn from the monitor 22 to the RAID controller 20A. As the duty cycle of the disk drives increases so does the probability of a disk drive failure. Referring also to FIG. 5, by monitoring the drive usage data and trends collected by the monitor 20 (FIG. 5, block 5A), at a certain duty cycle threshold the monitor 22 can assert a RAID Level Change signal on the signal line 23 to the RAID controller 20A (FIG. 5, block 5B) to automatically command (or recommend) that a RAID level change be made (e.g., from RAID 5 to RAID 10). In general, the RAID Level Change signal is asserted to cause or recommend a change to a RAID level that is more tolerant of a single or multiple disk drive failure than the current RAID level. Depending on the circumstances, the RAID controller 20A may respond by beginning the on-the-fly migration of the disk drives 20 from a current RAID level to another RAID level (e.g., from RAID 5 to RAID 10). Alternatively, the RAID controller 20A (or the monitor 22) may signal the user of the receipt of the RAID Level Change signal, thereby giving the user the opportunity to approve or reject the recommendation, which in some cases may require a hardware upgrade and/or reconfiguration. Alternatively, the RAID Level Change signal may be generated by the data processor 24A of the maintenance provider 24, and signaled to the RAID controller 20A via the monitor 22, or it may be signaled directly to the user via a suitable user interface. If accepted, the RAID level of the disk drives 20 is changed to a RAID level that is known to be more tolerant of disk drive failure (FIG. 5, Step 5C).

The process works in reverse as well, where if the disk usage falls below the same or a different threshold for some period of time, then the assertion of the RAID Level Change signal (or another signal) can indicate that a change to a lower RAID level is possible. In this case the user may be able to increase the overall storage capacity of the disk drives 20 by operating a lower RAID level, it being assumed that the probability of experiencing a single drive or a multiple drive failure has been reduced by the reduction in disk usage.

In general, this embodiment of the invention operates with an assemblage of disk drives having a certain disk drive redundancy configuration, and performs operations of monitoring the disk drives 20 during operation of the data storage system 10 to determine a duty cycle; comparing the determined duty cycle to a threshold value; and asserting a redundancy configuration change signal based on the result of the comparison. In the preferred embodiments the redundancy configuration is a RAID configuration having at any given time a certain RAID level that is subject to change, or at least review, based on the result of the comparison. As before, these various operations can be performed by computer code or program instructions stored in a memory or memories (more generally stored in a signal bearing medium, including fixed or removable disks) and executed by one or more data processors that comprise a part of, or that are coupled to, the system 10.

It can be noted that these embodiments related to RAID level changes (FIG. 5) may used in conjunction with the embodiments related to the dynamic determination of maintenance fees (FIG. 3), or either of these various embodiments may be used independently of the other. As but one example, the functionality expressed in the logic flow diagram of FIG. 5 may be incorporated into the RAID controller 20A, in conjunction with the functionality of the monitor 22 to determine the duty cycle of the disk drives. In this alternative embodiment of this invention the functionality of the maintenance provider 24, as expressed in FIG. 2, may or may not be present.

The foregoing description has provided by way of exemplary and non-limiting examples a full and informative description of the best methods and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent types of disk drives, disk drive configurations, data storage system architectures and data storage devices may be attempted by those skilled in the art. However, all such and similar modifications of the teachings of this invention will still fall within the scope of the embodiments of this invention.

Furthermore, some of the features of this invention may be used to advantage without the corresponding use of other features. As such, the foregoing description should be considered as merely illustrative of the principles, teachings and embodiments of this invention, and not in limitation thereof.

What is claimed is:

1. A data recording medium tangibly storing a program of machine-readable instructions executable by a digital processing apparatus to perform operations to determine a maintenance fee for a data storage system, the operations comprising:

monitoring at least one data storage device during operation of the data storage system to determine a data storage device duty cycle; and determining a current value of the maintenance fee based at least in part on the determined data storage device duty cycle; wherein the data storage device is comprised of a disk drive, wherein the monitoring operation further comprises recording over a sampling interval at least a number of seek operations, and wherein the recording over the sampling interval further records a distance that a read/write head moves during a seek operation.

2. A data recording medium as in claim 1, where the monitoring operation further comprises recording over the sampling interval at least a number of read operations.

3. A data recording medium as in claim 1, where the monitoring operation further comprises recording over the sampling interval at least a number of write operations.

4. A data recording medium as in claim 1, where there are a plurality of disk drives operated in a RAID configuration having a RAID level, further comprising operations of:

comparing the determined duty cycle to a threshold value; and asserting a RAID level change signal based on the result of the comparison.

5. A maintenance provider system operable for establishing a value for a maintenance fee to be charged for operating disk drive data storage system, said maintenance provider system comprising an interface for coupling to a monitor that monitors operation of the disk drive data storage system to determine usage of disk drives; and further comprising a processor responsive to information received from the monitor via the interface to determine a disk drive utilization factor and, based at least in part on the determined utilization factor, a current value for the maintenance fee; wherein the information comprises at least a number of disk drive seek operations, and wherein the information further comprises a distance that a read/write head moves during the seek operation.

6. A maintenance provider system as in claim 5, where the information comprises at least a number of disk drive read operations.

7. A maintenance provider system as in claim 5, where the information comprises at least a number of disk drive write operations.

8. A maintenance provider system as in claim 5, where the disk drive data storage system comprises a plurality of disk drives operated in a RAID configuration having a RAID level, where said processor is further responsive to the information for comparing a determined disk drive duty cycle to a threshold value, and to assert a RAID level change signal based on the result of the comparison.

9. A disk drive-based data storage system comprising:

means for monitoring said disk drives during operation of the data storage system to determine usage information for the disk drives, the usage information comprising at least one of a number of write operations per unit time, a number of read operations per unit time, and a number of seek operations per unit time; and interface means for coupling to means for determining a maintenance fee for the data storage system, said interface means reporting said usage information to said determining means;

wherein the usage information further comprises a distance that a read/write head moves during a seek operation.

10. A disk drive-based data storage system as in claim 9, where there are a plurality of disk drives operated in a RAID configuration having a RAID level, further comprising means for comparing the usage information to a threshold value and means for asserting a RAID level change signal based on the result of the comparison.

11. A method to determine a maintenance fee for a data storage system, comprising:

monitoring at least one data storage device during operation of the data storage system to determine a data storage device duty cycle; and determining a value of the maintenance fee based at least in part on the determined data storage device duty cycle; wherein the data storage device is comprised of a disk drive, and wherein monitoring further comprises recording over a sampling interval at least a number of seek operations, and wherein recording over the sampling interval further records a distance that a read/write head moves during a seek operation.

12. A method as in claim 11, where monitoring further comprises recording over the sampling interval at least a number of read operations.

13. A method as in claim 11, where monitoring further comprises recording over the sampling interval at least a number of write operations.

14. A method as in claim 11, where there are a plurality of disk drives operated in a RAID configuration having a RAID level, further comprising comparing the determined duty cycle to a threshold value and setting a RAID level change signal based on the result of the comparison.

15. A method as in claim 11, where determining the value of the maintenance fee is performed at a location remote from the data storage system, further comprising reporting a result of the monitoring to the location through a data communications network.

16. A method as in claim 11, where determining the value of the maintenance fee is performed at a location remote from the data storage system, further comprising reporting a result of the monitoring to the location at least in part though the Internet.

17. A method as in claim 11, where determining the value of the maintenance fee is performed at a location remote from the data storage system, further comprising conveying a result of the monitoring to the location.

18. A method as in claim 11, where monitoring occurs at a plurality of locations in the data storage system, further comprising collecting monitoring results from the plurality of locations, and forwarding the collected monitoring results to another location remote from the data storage system where the value is determined.

19. A method as in claim 18, where forwarding uses at least in part a TCP/IP communications protocol.

20. A method as in claim 18, where forwarding uses at least in part a wireless communications protocol.

* * * * *